United States Patent

[11] 3,541,942

[72] Inventors Wilhelm Bertram
Munich;
Georg Amesbichler, Munich-Aubing,
Germany
[21] Appl. No. 646,235
[22] Filed June 15, 1967
[45] Patented Nov. 24, 1970
[73] Assignee Ernst & Wilhelm Bertram
Munich-Pasing, Germany
[32] Priority June 16, 1966
[33] Germany
[31] No. B87597

[54] SHUTTER FOR PHOTOGRAPHIC CAMERAS
16 Claims, 7 Drawing Figs.
[52] U.S. Cl.................................................. 95/62,
95/63
[51] Int. Cl.................................................. G03b 9/14
[50] Field of Search.................................... 95/60, 62, 63

[56] References Cited
UNITED STATES PATENTS

| | | | |
|---|---|---|---|
| 2,463,206 | 3/1949 | Robertson.................. | 95/63 |
| 3,208,365 | 9/1965 | Cooper....................... | 95/60 |
| 3,302,544 | 2/1967 | Kiper.......................... | 95/60 |
| 3,373,672 | 3/1968 | Ichijo......................... | 95/63 |

*Primary Examiner*—John M. Horan
*Attorney*—Woodhams, Blanchard and Flynn

ABSTRACT: A two-lamellae-system shutter for photographic cameras comprising an open and closed lamellae system associated with the aperture. The opening of the open system and the closing of the closed system is effected by means of springs. The open system is held in the cocked closed position by means of a first locking pawl, the pawl being released by an electromagnet to open the system and control the aperture width. The closed system is held in the cocked open position by a second locking pawl, which pawl is released by an electromagnet upon termination of the desired exposure time whereby said system closes.

Patented Nov. 24, 1970

3,541,942

INVENTORS
WILHELM BERTRAM
GEORG AMESBICHLER
BY
Woodhams, Blanchard & Flynn
ATTORNEYS INVENTORS
WILHELM BERTRAM
GEORG AMESBICHLER
BY
Woodhams, Blanchard and Flynn
ATTORNEYS

SHUTTER FOR PHOTOGRAPHIC CAMERAS

This invention relates to a two-lamellae-system shutter for photographic cameras comprising an open and closed lamellae system associated with an aperture, the opening and closing movement of said open and closed lamellae systems being effected by a spring force, each of said systems being freeable by an electromagnetically operable locking pawl whereby the exposure time is controllable electrically by delaying the operation of the electromagnet freeing the closing movement.

Shutters of this type have been developed to achieve, by simple structural means, short exposure times. By controlling the exposure time with electrically actuated parts, the conventional mechanical retard mechanism is eliminated, which retard mechanism was expensive and made difficult the achievement of short exposure times because of the masses which had to be accelerated. In a known shutter of this type, each lamellae system comprises a drive ring and a lamella.

The mass to be accelerated during an exposure process is, in spite of the elimination of the retard mechanism, still very large, because of the separate lamella drive which thus prevents short exposure times. The cost of construction is still high and short exposure times are difficult to obtain.

Photographic shutters having two oppositely directed lamellae systems are also known, which shutters control the exposure time by means of a retard mechanism which can either be a classic gear retard mechanism or a pneumatic or hydraulic retard mechanism with control of the retard being effected by changing an aperture for controlling flow. Irregardless of how the retard mechanism is constructed, the cost of construction is high and the masses to be accelerated during each shutter process are great. Either a plurality of gears must be moved in the gear setting device or a flow means must be pushed back.

A two-lamellae-system shutter is also known which controls the exposure time electrically. For this purpose one single closed lamellae forming the closed lamellae system is held by an electromagnet whereby the anchor plate of the electromagnet is a part of the closed lamellae. The closed lamellae is loaded by a spring force by insertion of a lockable pull rod. One single open lamella, which is lockable by a release pin in its closed position, frees by unlocking of the pull rod in its open position the spring force which acts on the closed lamella. As soon as same is large enough to overcome the tension of the electromagnet, the closed lamellae moves in the closed position. The open lamella must here, in any case, first be in the complete open position before the closing movement of the closed lamella can be released. In addition, before movement of the closed lamella, a mechanical locking must first be released by the open lamella. In this manner, no extremely short exposure times can be achieved safely. This can also not be achieved because the pull rod must have associated therewith a mechanical equalization retard mechanism to prevent oscillations in the spring system from acting onto the closed lamella.

The basic purpose of the invention is to provide a shutter of the above-described type by simple structural means whereby very short exposure times can be easily and reliably achieved.

To attain said purpose, the invention provides that the lamellae are each by itself spring loaded and that the lamellae of each lamellae system, when the shutter is cocked, are directly supported on a locking pawl associated therewith.

For the shutter of the invention, during an exposure process, only the lamellae themselves are moved, being moved in one single direction of movement. The mass to be moved is therefore reduced to a minimum. The control of the exposure time is done electrically only so that no mechanical parts are needed therefor. The cost of construction of the shutter of the invention is consequently very low and short exposure time can be reliably kept because of the small masses and the electric control.

Each lamellae system advantageously comprises in a known manner a pair of oppositely directed swinging lamellae whereby the lamellae of each lamellae system, when the shutter is cocked, bear on opposed sides of the locking pawl associated therewith, which pawl is provided on the opposite side of the aperture from the lamellae point of rotation. By supporting the lamellae, which swing in opposite directions, on opposed sides of the locking pawl associated therewith, same is relieved of bending moments with respect to the axis of rotation and can therefore be moved out of the locked position by only a little force. The force needed to move the locking pawl is further decreased in said embodiment by having a large space between the lamellae pivot axis and the locking pawl so that the forces transmitted from the lamellae to the locking pawl remain small because of the lever conditions. The small current intensities which are usually on hand in a photo camera are therefore sufficient to reliably move the locking pawls.

The shutter is especially simple in structure if the lamellae of each lamellae system are arranged on one common pivot axis.

Each locking pawl is advantageously constructed as a spring-loaded two-arm lever, one lever of which forms a locking tip and the other lever of which forms an anchor plate for the electromagnet associated therewith. Each locking pawl therefore functions directly as the anchor plate of the electromagnet associated therewith so that no additional structural parts are needed.

In a preferred embodiment of the invention, each pair of lamellae has arranged thereto a pair of oppositely directed swingable winding bell cranks, the first legs of which carrying shoulders resting on the lamellae while a cocking device engages the second leg. Such bell cranks are especially simple constructive means to transfer the usual movement of the cocking device in one direction to the lamellae as moved in opposite direction.

The correlation of the winding bell cranks are advantageously swingable about a common pivot axis. This measure too is used for simple structure.

It is also advantageous for simple structure when the pivot axis of the lamellae pairs is, at the same time, the pivot axis of the winding bell cranks. Each lamellae system then has, including its winding bell cranks, only one pivot axis.

It is advantageous if the cocking device has an one-arm rocker arm associated with each lamellae pair, said rocker arm being connected with the second legs of the winding bell cranks by a pin-slot-connection and having a common spring-loaded winding ring which moves the rocker arms over control curves or cams during the winding against the spring force. This arrangement makes it possible to guarantee, by a simple rotation concentrically to the aperture, a movement of all winding bell cranks about their pivot axes.

A particular advantage of the shutter of the invention is that said shutter can be constructed at the same time as an aperture shutter. This is done by the invention in a way that the return movement of the cocking and winding parts of the open lamellae pair can be limited after cocking by an aperture control to a path which corresponds to the outward swinging, resulting in the desired aperture of the open lamellae. The basic idea of this measure is to use the cocking and winding parts of the open lamellae pair at the same time to limit the width of outward swinging of the open lamellae. This is possible since the cocking and winding parts are again free after the winding whereby the open lamellae are locked. They can at this point be brought, by an aperture adjusting device, to the position in which they later, during the running off of the open lamellae, are used as stops. Thus, the two-lamellae shutter simultaneously uses the cocking and winding parts for limiting the opening width and thus results in a two-lamellae-system shutter which functions as an aperture shutter.

To construct the shutter of the invention as an aperture shutter, same can be constructed in a particularly simple way by means of an aperture curve or cam connected to an aperture control part, which part can be moved into the return path of the rocker arm associated with the open lamellae pair, said aperture curve cooperating with a stop on the rocker arm. The return movement of said rocker arm is thus limited to the desired aperture size. The rocker arm itself holds the winding bell cranks over the pin-slot-connection, which bell cranks in turn limit the opening movement of the open lamellae.

To prevent an undesired disengaging of the locking pawls by vibrations and thus an opening of the aperture at an undesired time, it is advantageously provided that the locking pawls are locked in locking position by a safety element which sets said locking pawls free only upon operation of the release lever.

The safety element is advantageously a ring which is provided with recesses for the pawl locking tips and which is rotatable by means of the release lever, around the aperture against the spring force, said ring being lockable against return movement after the release and being freeable again by the cocking device after passing the locking pawls to the locking position.

It is furthermore advantageous, in order to prevent an error in exposure, if the release lever has at least two switches associated therewith, the first switch controlling a device for indicating the possibility of taking a picture, and the other switch operated thereafter for controlling the circuits of the electromagnets. The operator of the camera can first check by means of the indicating device whether a photo is possible. Only then can the shutter release process be initiated by switching on the electromagnets.

One preferred embodiment of the invention is illustrated in the drawings, wherein.

Figure 1:
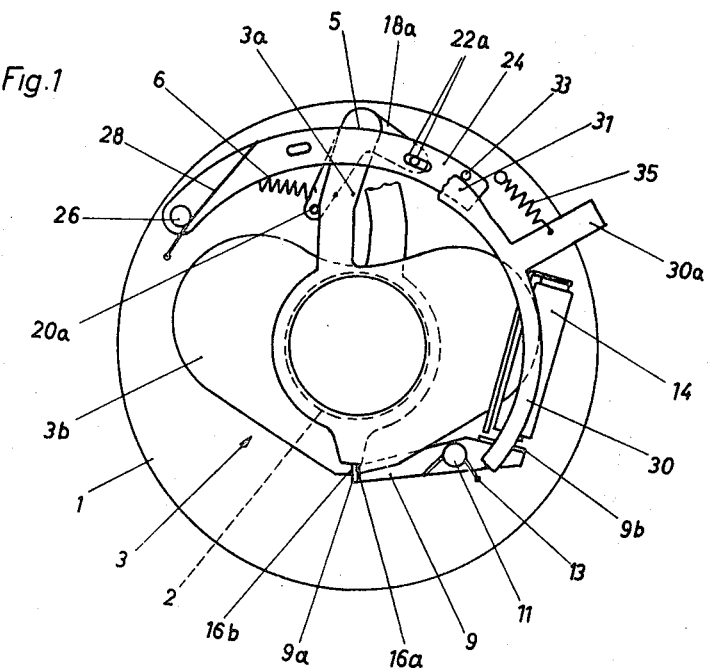
FIG. 1 is a front view of the shutter lamellae system of the shutter of the invention in open position.
Figure 2:
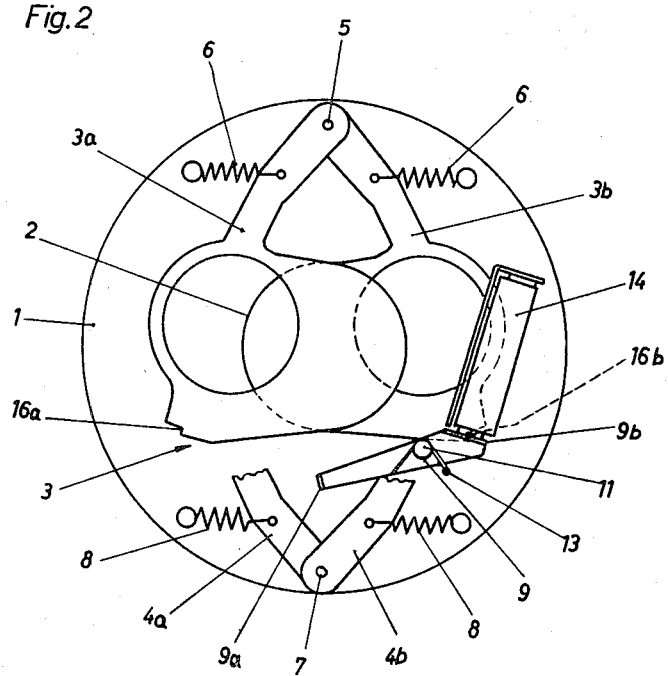
FIG. 2 is a front view of the shutter lamellae system in closed position.
Figure 3:
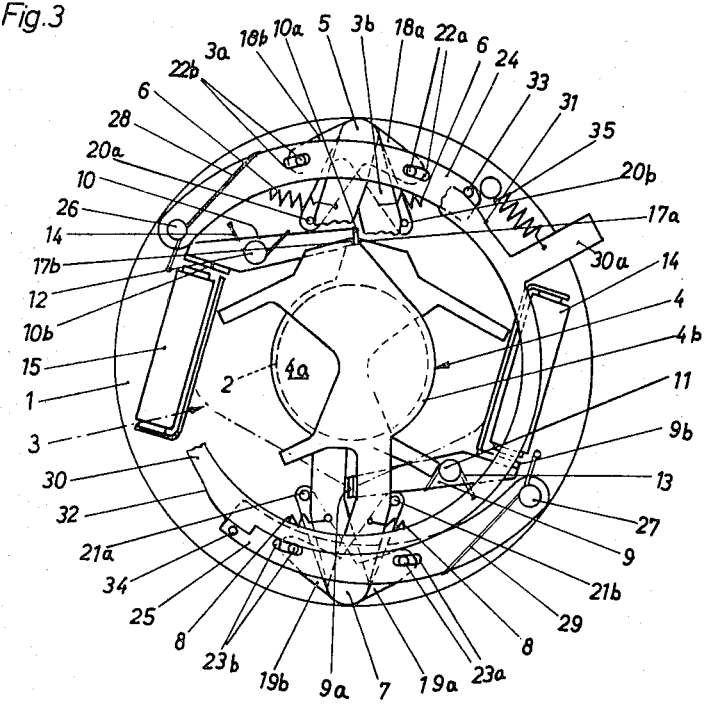
FIG. 3 is a front view of the open lamellae system and of the tensioning and winding parts of said open lamellae system of the shutter of the invention in closed position.
Figure 4:
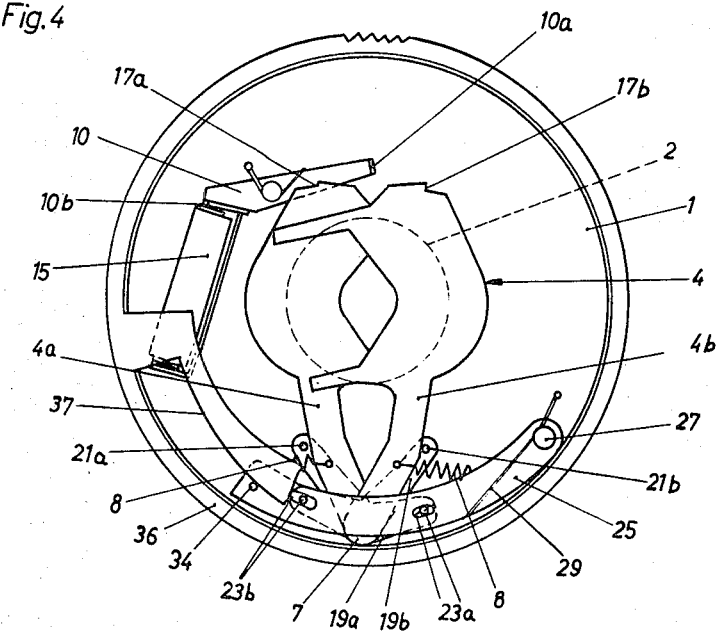
FIG. 4 is a front view of the open lamellae system in open position limited to a predetermined aperture value.

In the drawings 1 is the base plate to which the parts of the shutter of the invention are mounted. The center of the base plate 1 provides a circular aperture 2. Said aperture 2 has arranged adjacent thereto a shutter lamellae system 3 and an open lamellae system 4. The shutter lamellae system 3, particularly illustrated in FIGS. 1 and 2, comprises shutter lamellae 3a and 3b pivotable in opposite directions about a common pivot axis 5 and spring loaded in a closing direction by drive springs 6. The open lamellae system 4, particularly illustrated in FIGS. 3 and 4, comprises a pair of open lamellae 4a and 4b pivotable in opposite directions about a common pivot axis 7 and spring loaded in an opening direction by drive springs 8.

In the cocked position of the shutter, in which the shutter lamellae system 3 is the open position (FIG. 1) while the open lamellae system 4 is in the closed position (FIG. 3), the lamellae pairs 3a, 3b and 4a, 4b are held by locking pawls 9 or 10. Each locking pawl is constructed as a two-armed lever pivotally mounted about a pivot 11 or 12 and is loaded in locking direction by a spring 13 or 14. The one lever of each locking pawl forms a locking tip 9a or 10a while the other lever carries an anchor plate 9b or 10b. Said anchor plate is adapted to contact an electromagnet 14 or 15 which, by attracting the respective anchor plate, can pivot the respective locking pawl 9 or 10 about the pivot 11 or 12 in the direction of the final locking. As illustrated in the drawings the lamellae 3a, 3b with the shoulders 16a and 16b and the lamellae 4a, 4b with the shoulders 17a and 17b are supported, when in the locked position, on opposite sides of the locking tip 9a (FIG. 1) or 10a (FIG. 3) associated therewith. Said shoulders of each lamellae system are thereby positioned on the side opposite the pivot axis 5 or 7 with respect to the aperture 2. Because of this arrangement, the stress on the locking pawls is extremely small so that the forces which must be produced by the electromagnet 14, 15 for unlocking remain small.

To bring the lamellae systems 3 and 4 into the cocked position, a cocking and winding device is provided. Said device comprises a pair of bell cranks 18a, 18b or 19a, 19b rotatably mounted to the respective pivot axis 5 and 7. The first-mentioned bell crank pair 18a, 18b shows only the bell crank 18a in FIG. 1 in order to clearly understand the drawing. One arm of each bell crank bears with one catch pin 20a, 20b or 21a, 21b on the respective lamellae 3a, 3b or 4a, 4b. The other lever of each bell crank is coupled to a one-arm rocker arm 24 or 25 through a pin-slot-connection 22a, 22b or 23a, 23b. Each rocker arm 24 or 25 is pivotable about a pivot 26 or 27 and is loaded by a spring 28 or 29 opposite to the direction of winding. The rocker arms 24 and 25 are movable by means of a winding ring 30 (FIGS. 1 and 3) with a handle 30a against the spring load, said winding ring carrying curved sections or cams 31, 32. Said curved sections 31 and 32 cooperate with catch pins 33 and 34 on the rocker arms 24 or 25 and are angularly spaced in such a way that by turning the winding rings 30 in winding direction (clockwise direction in the drawing), the curved section 32 becomes effective first. The winding ring 30 is under the effect of a tension spring 35 opposite the direction of winding.

An aperture setting ring 36 (FIG. 4) carries an aperture curve or cam 37 which cooperates with the catch pin 34 of the rocker arm 25, which rocker arm coacts with the open lamellae system 4. The cam or curve 37 defines and controls the return movement of the rocker arm 25, which in turn is connected to the winding bell cranks 19a, 19b and controls the movement thereof during the return movement of the winding ring 30 under the effect of spring 35. This also defines the limits to which the lamellae 4a, 4b can swing in the open position.

Figure 5:
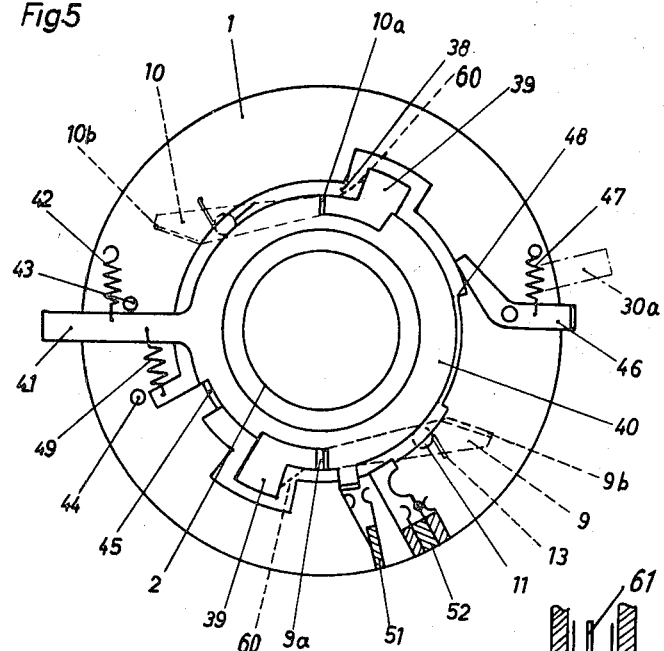
FIG. 5 is a front view of a locking ring for the locking latches of both lamellae systems in locked position.

As illustrated in FIG. 5, for securing the locking pawls in their locking position, there is provided a locking ring 38 having recesses 39 in the area of the locking tips 9a or 10a. A release ring 40 having a handle 41 is used to release the shutter, said release ring being rotatable in a direction opposite the force of a tension spring 42 from a stop 43 stationarily arranged on the base plate 1 to a counterstop 44. The release ring 40 rotatably drives the locking ring 38 by means of a lug 45 upwardly projecting from said locking ring. In the release position of the release ring 40, in which position the handle 41 of said release ring bears against the counterstop 44, the locking ring 38 is held by a swingable pawl 46 which is loaded in the locking direction by a tension spring 47. When the locking pawl 46 is moved or released by means of the handle 30a of the winding ring, the locking ring 38 with its locking shoulder 48 is released and is free to return to the initial position by the effect of a tension spring 49 which couples said locking ring 38 with the handle 41 of the release ring 40.

The release ring 40 provides a trip cam 50 which cooperates with a first switch 51 and a second switch 52. The first switch used is provided in the circuit of an indicating device, not illustrated, said indicating device showing to the operator whether the light conditions at the given setting are sufficient for taking a picture. The switch 52 is constructed as a double switch and is used in one switch position to release a flash device while said switch in the other switch position permits the current flow to the electromagnets 14 and 15.

The described arrangement operates in the following manner: When the shutter is in the cocked position, the parts are in the position illustrated in FIGS. 1, 3 and 5. The shutter lamellae 3a and 3b are in the open position and open or uncover the aperture 2. Said shutter lamellae are held in this position by the locking tip 9a of the locking pawl 9. In spite of this, no light can penetrate through the shutter because the open lamellae 4a and 4b are in closed position and are locked in this position by the locking tip 10a of the locking pawl 10.

If, by means of the handle 41, the release ring 40 is rotated counterclockwise as illustrated in FIG. 5, the trip cam 50 closes first the switch 51. If the operator reads on the light indicator which is thus released that the picture is possible, the release ring 40 is further rotated. Since the release ring 40 rotatably carries the locking ring 38 due to the lug 45, the recesses 39 are moved behind the locking tips 9a and 10a of the locking pawls 9 and 10, which frees same. Upon further movement of the release ring 40, the trip cam 50 closes the switch 52 whereupon the shutter runoff process is started.

Figure 6:
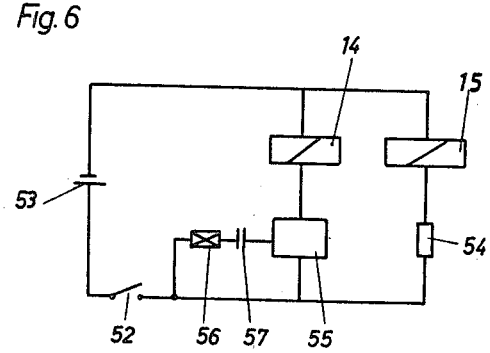
FIG. 6 is a schematical shifting arrangement of the electrical parts of the shutter of the invention.

According to the switching diagram of FIG. 6, the switch 52 is positioned in a circuit which comprises a current source 53 and the two electromagnets 14 and 15 in parallel connection. A fixed resistor 54 is connected in series to said electromagnet 15 which is connected to the open lamellae system 4, while a Schmitt-trigger 55 is in front of the electromagnet 14 which controls the movement of the closed lamellae system 3. The Schmitt-trigger 55 is started through a photoresistor 56 and a capacitor 57. Upon closing of the switch 52, voltage is first immediately applied to the electromagnet 15 which attracts the anchor plate 10b after the required time for the energization has passed and thus moves the locking pawl 10 against the effect of spring 14. The locking tip 10a thus moves out from between the shoulders 17a, 17b of the open lamellae 4a, 4b. The open lamellae are promptly moved by the effect of the tension springs 8 to the open position illustrated in FIG. 4. Their movement is defined and controlled by the curve 37 of the aperture setting ring 36. The open lamellae 4a, 4b upon swinging apart carry the winding bell cranks 19a, 19b due to the catch pins 21a, 21b. Said winding bell cranks move the rocker arm 25 inwardly about the pin-slot-connection 23a, 23b. This movement is stopped as soon as the catch pin 34 of the rocker arm 25 comes to rest against the aperture curve 37. The open width of the shutter thus depends on the position of said aperture curved 37.

When the switch 52 is closed by the trip cam 50 of the release ring 40, no voltage is at first applied to the electromagnet 14 which is associated with the closed lamellae system 3. The capacitor 57 is first loaded through the photoresistor 56. As soon as this is done, the Schmitt-trigger 55 is started. Only then is voltage applied to the electromagnet 14. The time period between closing of switch 52 and starting of the Schmitt-trigger 55 depends on the size of the photoresistor 56 which in turn is effected by the surrounding light during taking of the photo. The time period between the energization of the electromagnets 14 and 15 for the exposure time consequently depends on the size of the photoresistor 56 and thus, as desired, on the lighting.

If the electromagnet 14 is energized, it attracts its anchor plate 9b and by doing so moves the locking pawl 9 with its locking tip 9a in opening position and sets free the shoulders 16a, 16b of the closed lamellae 3a, 3b. Same are promptly moved from the position of FIG. 1 to the position of FIG. 2 by the tension springs 6 and completely or partially cover the aperture freed or uncovered by the open lamellae system 4. Exposure is thus concluded.

In the meantime, the release ring 40 with the handle 41, under the effect of the tension spring 42, rests against the stop 43. The locking ring 38, however, because of the abutment of the locking pawl 46 against the locking shoulder 48, remains in the position in which the recesses 39 make possible the releasing movement of the locking tips 9a and 10a.

To rewind the shutter, the winding ring 30 is rotated against the force of the spring 35 in a clockwise direction by means of the handle 30a. Upon this rotation, the control curve or cam 32 moves the rocker arm 25 and the catch pin 34 outwardly. Said rocker arm also moves the winding bell cranks 19a, 19b due to the pin-slot-connections 23a, 23b. Pursuant to their movement, the winding levers 19a, 19b swing the open lamellae 4a, 4b inwardly together against the force of the tension springs 8 due to the bearing contact of the catch pins 21a, 21b, said lamellae 4a, 4b moving inwardly until they are in the position illustrated in FIG. 3, in which position they cover the aperture 2. As soon as said aperture is completely covered, the control curve or cam 31 on the winding ring 30 contacts and moves the rocker arm 24 and the catch pin 33 outwardly.

Movement of rocker arm 24 also moves the winding levers 18a, 18b due to the pin-slot-connections 22a, 22b. The catch pins 20a, 20b bear against and move the closed lamellae 3a, 3b inwardly together until they are in the position illustrated in FIG. 1, in which position said closed lamellae uncover the aperture 2. The locking pawls 9 and 10, under the effect of springs 13 and 14, swing back to the locking position and lock both lamellae systems 3, 4 in the last-described positions. Finally, the handle 30a of the winding ring 30 contacts and moves the locking pawl 46 so that said locking pawl frees the locking shoulder 48. The locking ring 38, due to the effect of spring 49, returns to its initial position illustrated in FIG. 5 and locks the locking pawls in their locking positions.

After the winding, the handle 30a of the winding ring 30 is released. The tension spring 35 can then move said winding ring back to the starting position which also frees the rocker arms 24 and 25 and the winding bell crank pairs 18a, 18b and 19a, 19b which are connected to said rocker arms. The rocker arms swing back due to the effect of springs 28 and 29 whereby the path of the rocker arm 25 is limited by the aperture curve 37.

The parts are now back to their initial position so that a new release process can follow.

The invention is not limited to the illustrated embodiment. Each lamellae system could, for example, be comprised of only one single lamella.

In order to further decrease the forces produced by the electromagnet to operate the locking pawls, the possibility exists of completely eliminating the springs which move said locking pawls 9 and 10. In locking position, the locking pawls are then held by the friction of the lamellae shoulders 16a, 16b or 17a, 17b which rest on the side of said locking pawls. The electromagnets must overcome only the friction force in order to unlock. To ensure that the locking pawls return to their locking position during cocking of the shutter, sloped pressure areas are arranged on the locking ring 38 as indicated at 60 in FIG. 5. During the return movement of the locking ring 38 together with the cocking process, said sloped areas of pressure press the locking pawls into the locking position.

Figure 7:
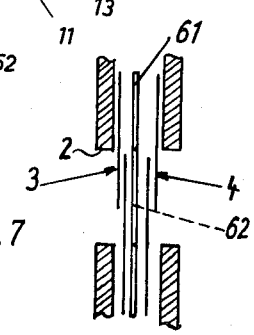
FIG. 7 is a fragmentary cross-sectional view illustrating a modification of the invention.

As schematically illustrated in FIG. 7, a further improvement of the shutter runoff process is achieved by separating the two lamellae systems 3 and 4 by a stationary adapter or intermediate ring 61 which has a central opening 62 in alignment with the aperture opening 2. Said adapter 61 prevents the lamellae of both systems from engaging or contacting one another when they are simultaneously moved in opposite directions. A simultaneous opposing runoff process is, however, indispensable if the shutter is supposed to function as a preset shutter with a very short exposure time.

All details disclosed in the description and the drawings can be important to the invention in any desired combination.

We claim:

1. A shutter associated with an aperture in a camera housing, comprising:
    a pair of lamellae mounted for pivotal movement in opposite directions about pivot means between positions of blocking and unblocking said aperture, said pair of lamellae including biasing means for biasing said pair of lamellae toward one of said positions relative to said aperture, each of said lamellae having stop means thereon;
    locking means including a locking pawl secured to said camera housing for simultaneously releasably holding each of the lamellae in said pair at a position opposite the biased position, said locking pawl being movable simultaneously into and out of engagement with said stop means, said locking pawl, when engaging said stop means, transferring an equal and opposite holding force between said lamellae to eliminate reaction forces transmittable through said locking pawl to said camera housing; and
    electromagnetic means operably associated with said locking pawl for effecting a simultaneous disengagement of said locking pawl from said pair of lamellae to permit said biasing means to simultaneously urge said pair of lamellae to the biased position.

2. A shutter according to claim 1, including a cocking means for moving said pair of lamellae in a direction opposite the biased direction, said locking pawl engaging each of said lamellae to maintain same in a cocked position and against the urging of the biasing means.

3. A shutter according to claim 1, wherein said pivot means is a pivot pin and each of the pair of lamellae are pivotally mounted on said pivot pin.

4. A shutter according to claim 1, wherein said locking pawl is constructed as a spring-loaded, two-arm lever, one arm of which defines a locking tip for simultaneously engaging and disengaging said lamellae and the other arm of which defines an anchor plate for the electromagnetic means associated therewith.

5. A shutter according to claim 1, including a locking ring having sloped pressure areas for guiding said locking pawls into a simultaneous engaging position during a movement of the lamellae toward one of said blocking and unblocking positions to hold said pair of lamellae in a position opposite the biased positions thereof.

6. A shutter associated with an aperture in a camera, comprising:
a pair of lamellae mounted for pivotal movement in opposite directions about pivot means between positions of blocking and unblocking said aperture, said pair of lamellae including biasing means for biasing said pair of lamellae toward one of said positions relative to said aperture, said pair of lamellae having connectingly associated therewith a pair of oppositely directed swingable winding bell cranks, the first legs of each of said bell cranks support shoulders which engage the sides of the lamellae and the second legs being engaged by a tensioning device;
a locking pawl associated with said pair of lamellae mounted on the opposite side of said aperture from said pivot means therefor, said locking pawl being positioned to engage and disengage said pair of lamellae at a position opposite the biased position; and
electromagnetic means operably associated with said locking pawl for effecting a disengagement of said locking pawl from said pair of lamellae to permit said biasing means to urge said pair of lamellae to the biased position.

7. A shutter according to claim 6, wherein each of said winding bell cranks are each pivotable about a pivot axis.

8. A shutter according to claim 7, wherein said pivot axes for the winding bell cranks are each coincident with the pivot axis of the pair of lamellae.

9. A shutter according to claim 6, including a cocking device which comprises a one-arm rocker arm associated with said pair of lamellae, said rocker arm being connected to the second legs of the winding bell cranks by a pin-slot-connection and further comprises a spring-biased winding ring having cam surface means thereon, each of said rocker arms including means engaging said cam surface means whereby said rocker arms are moved as said winding ring is moved against the urging of the spring bias during cocking.

10. A shutter according to claim 9, wherein the return movement of the cocking device and winding parts of said pair of lamellae is limited, after the cocking, by an aperture setting device which limits the outward swinging of said pair of lamellae to a desired aperture setting.

11. A shutter according to claim 9, wherein the return path of the rocker arm associated with said pair of lamellae has a movement along an aperture curve on the aperture setting device, said aperture curve cooperating with a stop on the rocker arm to limit the outward swinging of said pair of lamellae to a desired aperture setting.

12. A shutter according to claim 9, including a release ring associated with the locking pawl, said release ring having a release lever secured thereto; and wherein the locking pawl is locked in a locking position by said release ring, said release ring freeing said locking pawl only upon operation of said release lever.

13. A shutter according to claim 12, wherein the release ring is a ring provided with a recess for the locking tip on the locking pawl, said recess being rotatable about the aperture against a spring force by means of the release lever, said ring after being released being lockable against a return movement and being freeable by the winding ring after moving the locking pawl into the locking position.

14. A shutter according to claim 13, including at least two switches which are operably associated with the release lever, one switch being operated for indicating the possibility of taking a picture, the other switch being operated thereafter for controlling the circuit of the electromagnetic means.

15. A shutter associated with an aperture in a camera, comprising:
a first pair of lamellae mounted for pivotal movement in opposite directions about first pivot means between positions of blocking and unblocking said aperture, said first pair of lamellae including first biasing means for biasing said first pair of lamellae toward said blocked position relative to said aperture;
a second pair of lamellae mounted for pivotal movement in opposite directions about second pivot means between positions of blocking and unblocking said aperture, said second pair of lamellae including second biasing means for biasing said second pair of lamellae toward said unblocked position;
a locking pawl associated with each of said first and second pairs of lamellae mounted on the opposite side of said aperture from each of said first and second pivot means therefor, each of said locking pawls being positioned to engage and disengage each of the respective ones of said first and second pairs of lamellae to lock same in a position opposite the biased position so that said first pair of lamellae is in the unblocked position and said second pair of lamellae is in the blocked position; and
electromagnetic means operably associated with each of said locking pawls for controlling the time between which the locking pawls are operated to disengage the respective ones of said first and second pairs of lamellae to permit said first and second biasing means to urge said pairs of lamellae to the respective blocked and unblocked positions at a spaced time interval.

16. A shutter according to claim 16, including a stationary adapter separating the first and second lamellae pairs and having an opening therein aligned with the aperture.